(12) United States Patent
Jensen

(10) Patent No.: US 9,909,783 B2
(45) Date of Patent: Mar. 6, 2018

(54) TWISTED CONDUIT FOR GEOTHERMAL HEAT EXCHANGE

(71) Applicant: Robert Jensen, Lyndhurst, NJ (US)

(72) Inventor: Robert Jensen, Lyndhurst, NJ (US)

(*) Notice: Subject to any disclaimer, the term of this patent is extended or adjusted under 35 U.S.C. 154(b) by 157 days.

(21) Appl. No.: 13/844,475

(22) Filed: Mar. 15, 2013

(65) Prior Publication Data

US 2014/0262136 A1 Sep. 18, 2014
US 2017/0299225 A9 Oct. 19, 2017

Related U.S. Application Data

(63) Continuation-in-part of application No. 13/358,378, filed on Feb. 16, 2012, now Pat. No. 8,640,765, which is a continuation-in-part of application No. 12/660,226, filed on Feb. 23, 2010, now Pat. No. 9,109,813, application No. 13/844,475, which is a continuation-in-part of application No. 13/385,383, filed on Feb. 16, 2012, now abandoned, which is a continuation-in-part of application No. 12/660,225, filed on Feb. 23, 2010, now abandoned.

(51) Int. Cl.
*F24J 3/08* (2006.01)

(52) U.S. Cl.
CPC .............. *F24J 3/083* (2013.01); *Y02E 10/125* (2013.01)

(58) Field of Classification Search
CPC ...... F24J 3/08; F24J 3/081; F24J 3/082; F24J 3/083; F24J 3/084; F24J 3/085; F24J 3/086; F28D 7/04; F28D 7/0475; F28D 7/06; F28D 7/085; F28D 7/1669

USPC ................ 165/45; 166/302; 62/260
See application file for complete search history.

(56) References Cited

U.S. PATENT DOCUMENTS

| | | | |
|---|---|---|---|
| 2,458,826 A | | 1/1949 | Blumberg et al. |
| 2,578,280 A | * | 12/1951 | Barnard ................. F16L 11/22 138/111 |
| 2,658,286 A | * | 11/1953 | Spurlin .................. B65G 27/00 198/756 |
| 2,911,047 A | | 11/1959 | Henderson |

(Continued)

FOREIGN PATENT DOCUMENTS

| | | |
|---|---|---|
| CH | 000000658513 | 11/1986 |
| DE | 102007018979 B3 | 8/2008 |

(Continued)

OTHER PUBLICATIONS

International Ground Source Heat Pump Association (IGSHPA) website is at http://www.igshpa.okstate.edu/geothermal/geothermal.html; The IGSHPA was established in 1987.

(Continued)

*Primary Examiner* — Ljiljana Ciric
(74) *Attorney, Agent, or Firm* — Harold G. Furlow, Esq.

(57) ABSTRACT

A geothermal heat exchange apparatus which is a flexible assembly of a plurality of pipes twisted on a central conduit. The central conduit has a tubular structure. The plurality of pipes is twisted around the central conduit. The plurality of pipes is connects to an external environmental conditioning apparatus that supplies a heat exchange liquid for the transfer of heat through the plurality of pipes. The geothermal heat exchange apparatus is adapted for positioning in a hole in the earth for the exchange of heat.

20 Claims, 6 Drawing Sheets

(56) References Cited

U.S. PATENT DOCUMENTS

| | | | |
|---|---|---|---|
| 3,062,289 A | 11/1962 | Eades | |
| 3,189,098 A | 6/1965 | Haeber | |
| 3,461,952 A * | 8/1969 | Decker | H01F 27/22 |
| | | | 165/104.19 |
| 3,913,668 A | 10/1975 | Todd et al. | |
| 4,236,899 A * | 12/1980 | Gulden | C01B 3/38 |
| | | | 123/3 |
| 4,279,294 A * | 7/1981 | Fitzpatrick | F24J 3/081 |
| | | | 165/104.26 |
| 4,279,544 A | 7/1981 | Brun et al. | |
| 4,371,036 A | 2/1983 | Fordsmand | |
| 4,394,814 A * | 7/1983 | Wardman | F03G 6/06 |
| | | | 126/561 |
| 4,421,136 A | 12/1983 | Aubert | |
| 4,431,069 A * | 2/1984 | Dickinson, III | E21B 7/04 |
| | | | 166/278 |
| 4,495,723 A * | 1/1985 | Wasserman | A01G 13/06 |
| | | | 165/45 |
| 4,646,818 A * | 3/1987 | Ervin, Jr. | E01C 11/26 |
| | | | 126/271.1 |
| 4,677,863 A * | 7/1987 | Gay | B01D 51/10 |
| | | | 422/504 |
| 4,715,429 A * | 12/1987 | Mogensen | 165/45 |
| 4,836,275 A * | 6/1989 | Sakaya | F24J 3/086 |
| | | | 165/104.21 |
| 4,865,081 A * | 9/1989 | Neumann | B04B 5/0442 |
| | | | 138/103 |
| 4,880,051 A * | 11/1989 | Ohashi | E04D 13/103 |
| | | | 126/271.1 |
| 4,917,175 A | 4/1990 | Sakaya et al. | |
| 4,995,450 A | 2/1991 | Geppelt et al. | |
| 5,054,541 A * | 10/1991 | Tripp | F24J 3/081 |
| | | | 126/676 |
| 5,080,000 A * | 1/1992 | Bubic | B25J 18/06 |
| | | | 294/119.3 |
| 5,195,158 A * | 3/1993 | Bottoms, Jr. | G02B 6/4407 |
| | | | 385/105 |
| 5,204,048 A * | 4/1993 | Rider | B01D 21/0003 |
| | | | 210/262 |
| 5,329,992 A | 7/1994 | Tripp | |
| 5,339,890 A * | 8/1994 | Rawlings | F24J 3/084 |
| | | | 165/142 |
| 5,372,016 A * | 12/1994 | Rawlings | F24J 3/081 |
| | | | 165/173 |
| 5,477,914 A | 12/1995 | Rawlings | |
| 5,630,447 A | 5/1997 | Jensen | |
| 5,816,314 A | 10/1998 | Wiggs et al. | |
| 5,822,484 A * | 10/1998 | Arroyo | G02B 6/4407 |
| | | | 385/101 |
| 6,000,459 A | 12/1999 | Jeppesen | |
| 6,142,215 A | 11/2000 | Paulsen et al. | |
| 6,212,896 B1 | 4/2001 | Genung | |
| 6,558,500 B2 | 5/2003 | Matsuura et al. | |
| 6,584,251 B1 * | 6/2003 | Ardouin | G02B 6/449 |
| | | | 385/100 |
| 6,607,517 B1 * | 8/2003 | Dae | A61F 7/12 |
| | | | 604/31 |
| 6,692,519 B1 * | 2/2004 | Hayes, Jr. | A61F 7/12 |
| | | | 128/898 |
| 6,860,320 B2 * | 3/2005 | Johnson et al. | 165/45 |
| 6,979,776 B1 | 12/2005 | Zimmerman | |
| 7,255,096 B2 | 8/2007 | Craig et al. | |
| 7,308,932 B2 * | 12/2007 | Doh | B01D 63/02 |
| | | | 165/158 |
| 7,380,584 B2 | 6/2008 | Ippoushi et al. | |
| 7,382,955 B1 * | 6/2008 | Keller | G02B 6/441 |
| | | | 385/100 |
| 7,574,885 B2 * | 8/2009 | Hansen | B21D 11/06 |
| | | | 29/890.037 |
| 7,575,047 B2 | 8/2009 | Lackinger et al. | |
| 8,640,765 B2 * | 2/2014 | Jensen | F16L 3/223 |
| | | | 165/45 |
| 9,109,813 B2 * | 8/2015 | Jensen | F16L 9/19 |
| 9,284,952 B2 * | 3/2016 | Peele | F24J 3/081 |
| 9,574,551 B2 * | 2/2017 | Parrella, Sr. | F03D 1/04 |
| 2002/0045925 A1 * | 4/2002 | Keller | A61F 7/12 |
| | | | 607/106 |
| 2006/0137880 A1 | 6/2006 | Figenschou et al. | |
| 2007/0017243 A1 * | 1/2007 | Kidwell | C10L 3/10 |
| | | | 62/260 |
| 2007/0029067 A1 | 2/2007 | Kidwell et al. | |
| 2007/0144716 A1 * | 6/2007 | Doh | B01D 63/02 |
| | | | 165/158 |
| 2007/0213793 A1 * | 9/2007 | Hayes, Jr. | A61F 7/12 |
| | | | 607/105 |
| 2008/0170982 A1 * | 7/2008 | Zhang | B82Y 10/00 |
| | | | 423/447.3 |
| 2008/0289795 A1 | 11/2008 | Hardin et al. | |
| 2009/0071499 A1 * | 3/2009 | Wyatt | A45D 40/265 |
| | | | 132/218 |
| 2009/0071500 A1 * | 3/2009 | Wyatt | A45D 40/265 |
| | | | 132/218 |
| 2009/0071639 A1 | 3/2009 | Numata et al. | |
| 2009/0107650 A1 | 4/2009 | Feldmann | |
| 2009/0294095 A1 * | 12/2009 | Brummitt | E02D 3/11 |
| | | | 165/45 |
| 2009/0321417 A1 | 12/2009 | Burns | |
| 2010/0025008 A1 | 2/2010 | Walford | |
| 2010/0099570 A1 * | 4/2010 | Takayasu | H01B 12/02 |
| | | | 505/163 |
| 2010/0101675 A1 * | 4/2010 | Do | F16L 11/083 |
| | | | 138/130 |
| 2011/0024080 A1 * | 2/2011 | Bose | F28D 3/02 |
| | | | 165/71 |
| 2011/0230700 A1 * | 9/2011 | Sing | A61N 5/1015 |
| | | | 600/7 |
| 2015/0017416 A1 * | 1/2015 | Ruby | B29C 70/523 |
| | | | 428/298.7 |
| 2015/0017437 A1 * | 1/2015 | Kenny | B29C 70/523 |
| | | | 428/367 |
| 2016/0184735 A1 * | 6/2016 | Wardle | B01D 11/048 |
| | | | 210/634 |
| 2016/0290681 A1 * | 10/2016 | Lieskoski | F28D 1/0472 |
| 2017/0035430 A1 * | 2/2017 | Sarge | A61B 17/12109 |

FOREIGN PATENT DOCUMENTS

| | | |
|---|---|---|
| EP | 1486741 A1 | 12/2004 |
| JP | 2003156294 A | 5/2003 |
| JP | 2009092350 A | 4/2009 |
| WO | WO2008/03184 A1 | 1/2008 |

OTHER PUBLICATIONS

Summit Mechanical (Summit) website at www.summitmechsystems.com/pages/3.1.html; 2009.
www.renewableheating101.com/geothermal/loops; 2009; see https://plus.google.com/101321559606193611805/.
http://minnesotageothermalheatpumpassociation.com/geothermal website address; 2009; Minnesota Geothermal Heat Pump Association.
http://www.informedbuilding.com/Geothermal/Main16/Types-of-Geotherm now located at http://www.informedbuilding.com/content/view/17/68/ for geothermal; 2009; Informed Building.

* cited by examiner

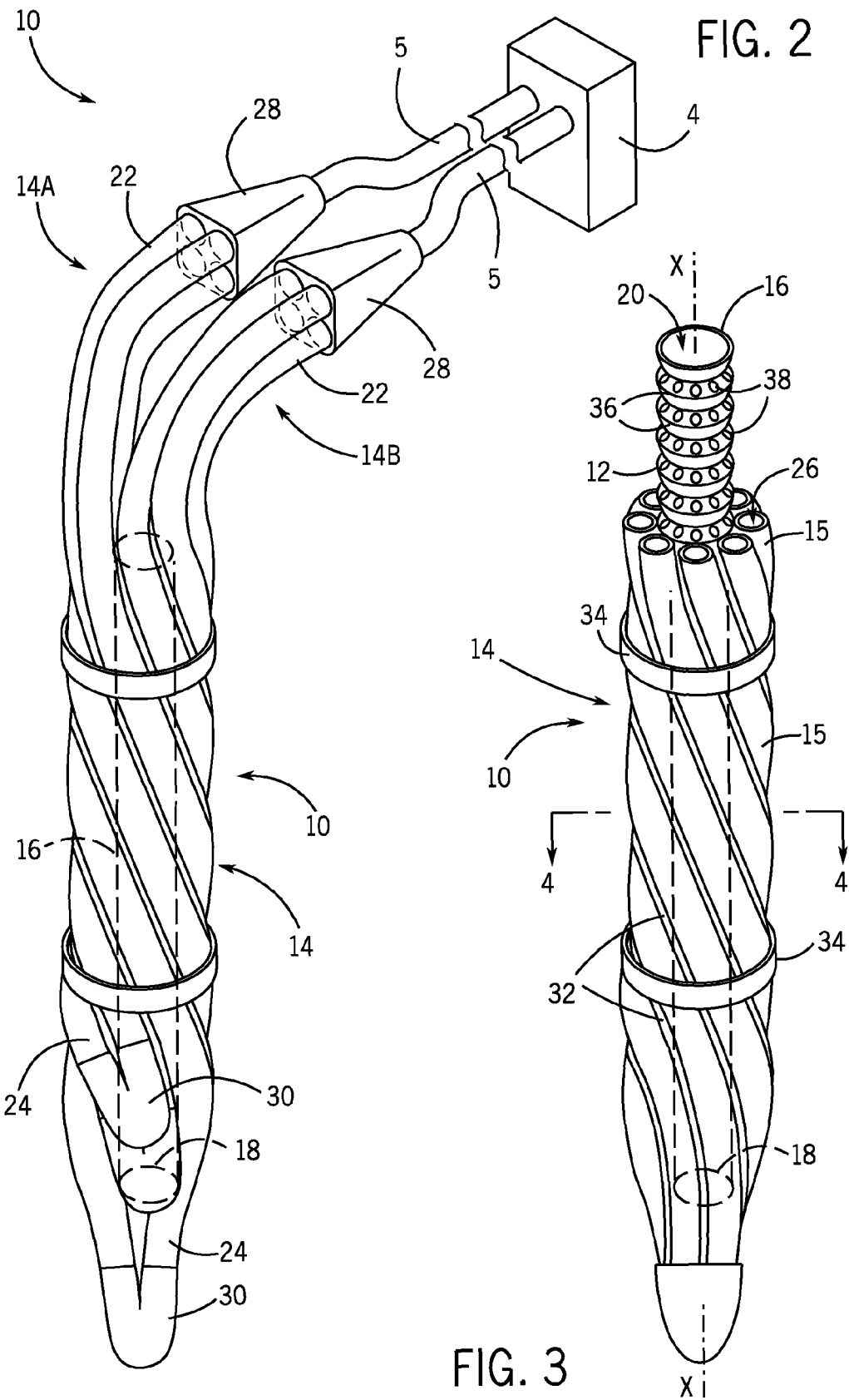

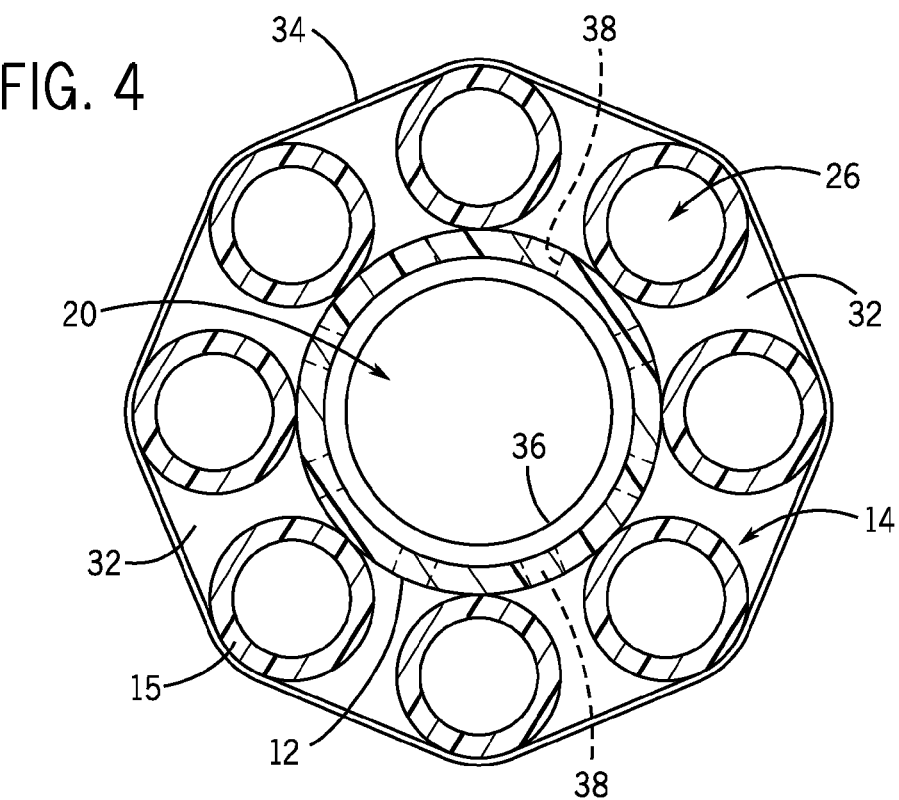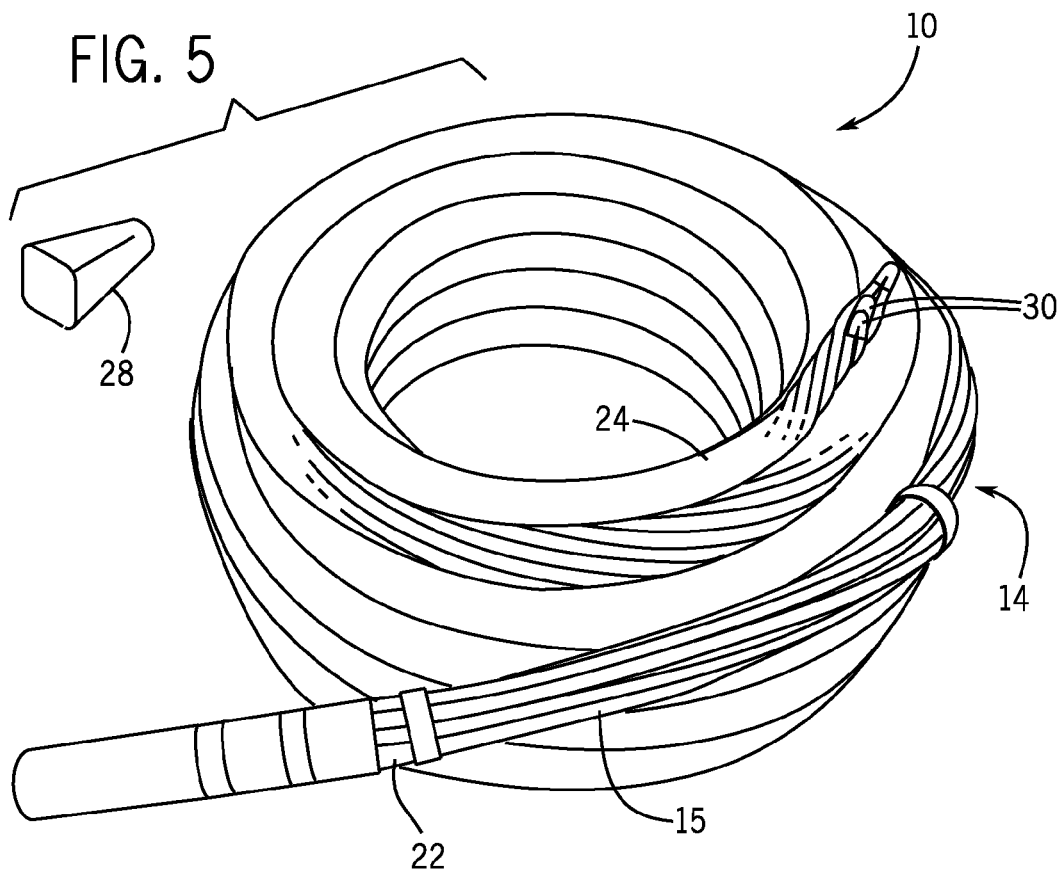

TWISTED CONDUIT FOR GEOTHERMAL HEAT EXCHANGE

CROSS-REFERENCE TO RELATED APPLICATIONS

This application claims priority to and is a continuation in part of U.S. patent application Ser. No. 13/385,378 filed Feb. 16, 2012 that is a continuation-in-part of U.S. patent application Ser. No. 12/660,226 filed Feb. 23, 2010 and U.S. patent application Ser. No. 13/385,383 filed Feb. 16, 2012 that is a continuation-in-part of U.S. patent application Ser. No. 12/660,225 filed Feb. 23, 2010, the disclosures of which are incorporated by reference herein and made a part of this application.

BACKGROUND OF THE INVENTION

Field of the Invention

The present invention relates to the arrangement of pipes for geothermal heat exchange and in particular to arrangements of a plurality of pipes twisted onto a central conduit for geothermal heat exchange.

Description of the Related Art

Geothermal heat exchange structures are well known and include a broad array of configurations for the exchange of heat between an environmental conditioning device and the earth. An idealized example of an environmental conditioning system with a geothermal heat exchanger is shown in FIG. 1. The environmental conditioning systems defined herein include a geothermal heat exchanger that provide environmental conditioning for a structure 2 using an environmental conditioning apparatus such as a heat pump or other similar device 4 that is in fluid communication with a pipe 5 that contains a liquid for the transfer of heat. Pipe 5 is a geothermal heat exchanger positioned in a hole 6 in the ground 8. Pipe 5 can be a single loop, a single pipe with multiple branches, a coaxial pipe and multiple pipes depending upon the desired construction of the geothermal heating system.

Environmental conditioning apparatus or heat pumps 4 that use geothermal heat exchangers are commonly identified as heating and cooling systems. Geothermal heat pumps 4 are known for their superior performance in delivering energy conserving heating and/or cooling to homes, industrial buildings and residential and industrial complexes in many climates. As defined herein, environmental conditioning apparatus include heating, cooling and combined heating and cooling systems. See, for example, http://www.igshpa-.okstate.edu/geothermal/geothermal.html; www.summit-mechsystems.com/pages/3.1.html; www.renewableheating101.com/geothermal/loops; http://minnesotageothermalheatpumpassociation.com/geothermal/earth-loop-options/; and http://www.informedbuilding-.com/Geothermal/Main16/Types-of-Geotherm.

However, a barrier to the wide spread use of geothermal heat exchangers is the high cost of installation of pipe 5 ground loops that provide the essential heat transfer from the heat exchange liquid that is circulated through pipes 5 to the earth 8. Also, the presently available ground-loop pipes 5 are limited in many instances in their ability to efficiently utilize vertical boreholes 6 and exchange heat with the earth.

Different geothermal heat exchangers have attempted to overcome these efficiency limitations. The aforementioned websites discuss the various ground loop technologies. Examples of commonly used ground loop technologies include the following: horizontal ground loops, vertical ground loops, and slinky coil ground loops. The slinky coil ground loop is a variation of the horizontal ground loop and it too requires a substantial amount of horizontal land as do other horizontal ground loops. Vertical loops include multiple pipe vertical loops that use less horizontal land, but their structural configurations and relationship to the borehole still limit heat transfer.

Ground loops are usually required to be at least partially grouted as part of their installation. Horizontal and/or multi-angled boreholes can also require grouting. While the thermal or heat transfer coefficients of grouts vary, it is preferred to grout the entire borehole of vertical installations. The goal is to preclude voids in the grout that reduce the efficiency of the heat transfer. The standard practice is to insert a grout pipe all the way to the bottom of the bore and fill the borehole from the bottom up. This process also displaces any water that has pooled at the bottom of the borehole. The grout pipe, however, takes up space in the borehole and can be difficult to insert into the borehole as it has a tendency to catch on irregularities in the surface of the wall of the borehole as well as the pipes. Further installations that only provide bottom to up grouting through a tremie are vulnerable to the creation of voids in and around the arranged pipes and clamps.

When multiple pipes 5 are closely arranged for geothermal heat exchange, it is known that spacing the pipes enhances the heat transfer by increasing the heat transfer surface area. Methods of keeping adjoining pipes separated include the use of headers, footers and clips, in various forms that position individual pipes 5 relative to one another, a tremie type pipe and/or the wall of the borehole. Some multiple pipe configurations include secondary branches that define loops. These branched structures join branches using extended rigid connectors that are known as headers and footers that divide and/or connect pipes 5 in fixed spaced separation relative to one another. Headers and footers, however, take up an excessive amount of horizontal and/or in particular vertical space in the earth which undesirably increases time and cost for installation.

Clips and springs and even headers and footers, keep the pipes separated and oriented advantageously where the pipe is close to objects. Problems arise, however, because the Clips are typically installed every 10-20 feet and between the clips the pipes are not controlled and can maneuver themselves into undesirable positions away from the borehole wall. Clips have some advantages in potentially fixing the position of pipes 5 relative to one another, a tremie pipe or the borehole in proximity to the clip, but clips require manual positioning prior to installation and take up valuable space within the borehole. The taking of excessive space in the borehole can undesirably reduce the quantity and/or size of pipes 5 in the borehole and complicate the use of a tremie pipe and/or grouting due the position of the clips extending transverse to the alignment of the borehole. Headers, footers and clips also limit the flexibility of arranging pipes 5 in that the ability to add or remove one or more pipes can be burdensome and require the changing of headers and/or footers as well as the type of clip installed on pipes 5.

It is also known that geothermal heat exchange applications using straight and/or rigid pipes have multiple limitations that include transportation and manual labor required to connect and then install the one or more straight pipes 5. Coaxial pipes are typically straight pipes with thicker walls that structurally support and maintain the relative position of the inner walls of the pipe that separate the inflow and outflow. The thickness of walls of coaxial pipes undesirably decreases the heat exchange properties of those pipes. Further straight pipes 5 require the creation of turbulent flow in order to achieved preferred rates of heat transfer or exchange. This requires the insertion of mechanical interruptions in the interior of pipe 5 such as undulations and/or vanes that deflect and/or interrupt the flow in pipe 5 to create turbulent flow in pipe 5 with elevated Reynolds numbers and enhanced heat transfer. The creation of turbulent flow is commonly created through high flow rates of the heat exchanging fluid within pipe 5 and can result in undesirable increased power consumption of the overall system.

Heretofore there has not been a high efficiency compact and flexible arrangement of a plurality of pipes for geothermal heat exchange. The geothermal heat exchange apparatus includes a twisted, approximately parallel and spaced arrangement of individual pipes of a plurality of pipes around a central conduit. The geothermal heat exchange apparatus is flexible and can be compactly coiled for storage and transportation as a complete assembly and then readily installed in a borehole. The twist of the plurality of pipes controls the position of each pipe of the plurality of pipes ensuring contact with the center conduit and establishing each pipe of the plurality of pipes in an approximately fixed spaced relation relative to the other pipes of the plurality of pipes.

SUMMARY OF THE INVENTION

The present disclosure is a novel structure of a geothermal heat exchange apparatus that facilitates the ease of storage, transportation, installation and thermal transfer efficiency. Specifically, the geothermal heat exchange apparatus includes the twisting of a plurality of pipes onto a central conduit in a compact minimum diameter form that can be readily uncoiled and inserted into a borehole. It is understood that while it is preferred in general to minimize the diameter of the borehole, there are applications in which the minimum diameter borehole is not necessarily the most desired or preferred approach for heat exchange. It is understood that it can be desirable to drill the borehole to a desired diameter vice the minimum diameter for the installation of the compact geothermal heat exchange apparatus. The structure of the geothermal heat exchange apparatus makes more efficient use of the borehole space by placing more pipe into the borehole in a compact spaced arrangement for heat transfer. The unique structural arrangement of the geothermal heat exchange apparatus creates additional surface area for heat transfer surface through flexible thin walled pipes in a small diameter borehole. The twisted plurality of pipes is wrapped in helical arrangement that is in contact with the center conduit such that the interface between the plurality of pipes and the central conduit bind the plurality of pipes in position on the central conduit. This structural arrangement also provides support for retaining the relative position of each pipe during installation in a relatively tight borehole. The flexible nature of the conduit and the plurality of pipes in a twisted arrangement is easily coiled and transported in a roll to a job site.

An arrangement of flexible pipes for geothermal heat exchange is described that comprises a central conduit and a plurality of pipes. The central conduit has a tubular structure that includes a first end portion and an opposed second end portion. The central conduit defines an aperture in the first end portion that is aligned with the longitudinal axis of the central conduit and extends the first end portion and the second end portion.

Each pipe of the plurality of pipes has a first end portion and an opposed second end portion. Each pipe has a tubular structure that preferably has a circular cross-section perpendicular to the longitudinal axis. The plurality of pipes is twisted around the central conduit in an approximately parallel arrangement and in an approximately fixed spaced separation that defines a gap between adjacent pipes. Each pipe of the plurality of pipes is positioned in direct contact with the central conduit. The second end portion of each pipe of the plurality of pipes is connected by a joint. The geothermal heat exchange apparatus is flexible and coilable into a roll. The first end portion of each pipe of the plurality of pipes is adapted to connect to an external environmental control system for the transfer of a liquid that is a heat exchange medium through the plurality of pipes. The plurality of pipes provides an extended arcuate pathway for the exchange of heat through the plurality of pipes and between the liquid and the earth. The external environmental control system at least includes heating and/or cooling.

Each pipe of the plurality of pipes is connected to one U-bend. The U-bend preferably connects the pipes of the plurality of pipes in the twisted approximately parallel arrangement. The first end portion of a first set of pipes connects to a first manifold that receives inflow to the first set of pipes and a second set of pipes connects to a second manifold that receives outflow from the second set of pipes. The first set of pipes and the second set of pipes comprise the plurality of pipes. The manifold is adapted to connect to the external environmental control system.

The joint receives and redirects the flow from a first set of pipes of the plurality of pipes to at least one outflow pipe. The first set of pipes and the at least one outflow pipe comprise the plurality of pipes. The joint can be a manifold that defines a reservoir. The manifold receives the flow from a first set of pipes of the plurality of pipes and directs the flow into the reservoir and redirects the flow from the reservoir into a second end portion of at least one outflow pipe. The first set of pipes and the at least one outflow pipe comprise the plurality of pipes of the geothermal heat exchange apparatus.

The geothermal heat exchange apparatus can further include bands transverse to a longitudinal axis of the multipipe arrangement. The center pipe is a through pipe that defines a first aperture that extends between the first end portion and the second end portion. The diameter of each pipe of the plurality of pipes in the twisted arrangement can vary. In one preferred embodiment, the plurality of pipes includes at least one pair of pipes. The second end portion of each pipe of the at least one pair of pipes connects to a U-bend type joint.

BRIEF DESCRIPTION OF THE DRAWINGS

FIG. 2 is a perspective view of the geothermal heat exchange apparatus of the present disclosure;

FIG. 3 is a partial cut-away perspective view of the geothermal heat exchange apparatus of FIG. 2;

FIG. 4 is a cross-section taken along lines 4-4 of the geothermal heat exchange apparatus of FIG. 3;

FIG. 5 is a perspective view of the geothermal heat exchange apparatus of FIG. 2 coiled into a roll;

DETAILED DESCRIPTION OF THE INVENTION

Figure 1:
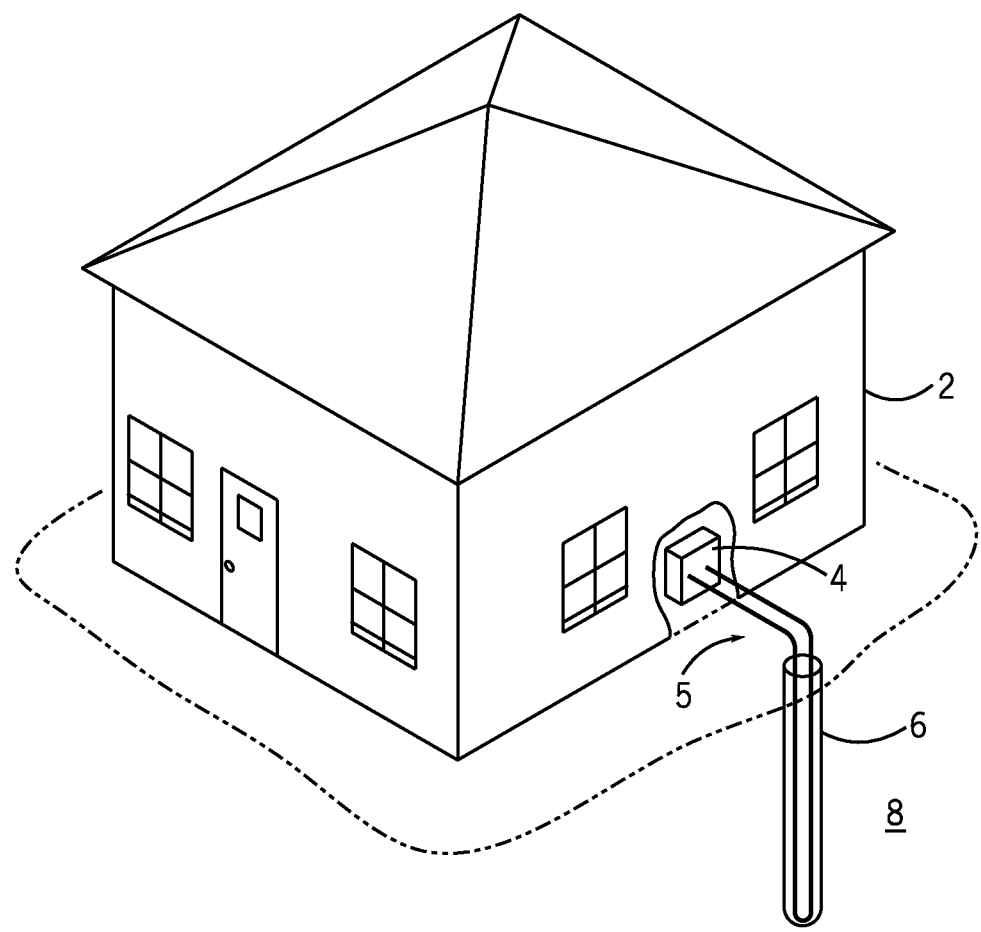
FIG. 1 is a perspective view of an idealized prior art environmental control system that uses a single conduit for geothermal heat exchange.

Referring initially to FIG. 2, a geothermal heat exchange apparatus 10 includes a center conduit 12 and a plurality of pipes 14. The plurality of pipes 14 is positioned in a twisted arrangement on center conduit 12. Geothermal heat exchange apparatus 10 defines a first longitudinal axis-X aligned with a centerline of central conduit 12.

Center conduit or conduit 12 has a flexible tubular structure that includes a first end portion 16 and an opposed second end portion 18. The tubular wall of conduit 12 defines an aperture 20 that is a through hole that extends between first end portion 16 and second end portion 18. Aperture 20 has a first inside diameter. In one preferred embodiment, the corrugated center conduit 12 dimensions include an inside diameter of approximately 1.9 inches, outside diameter of approximately 2.375 inches and a wall thickness of approximately $1/16^{th}$ or 0.0625 inches. It is understood that the size of the inside diameter can vary depending upon the intended geothermal heat exchange application.

As shown in FIGS. 2 and 3, geothermal heat exchange apparatus 10 has an approximately tubular overall structure defined by through hole 20 of the center conduit 12 and the twisting arrangement of the plurality of pipes 14 around central conduit 12. Plurality of pipes 14 has a flexible tubular structure that includes a first end portion 22 and an opposed second end portion 24. Each pipe 15 of the plurality of pipes 14 is a conduit that defines an aperture 26 that is a through hole that extends between the first end portion 22 and the second end portion 24. Aperture 26 of each pipe 15 of the plurality of pipes 14 is shown as having a relatively small diameter relative to center conduit 12, but the size of each pipe 15 and the corresponding aperture 26 of each pipe 15 of the plurality of pipes 14 can vary depending upon the intended application. In one preferred embodiment, individual pipes 15 of the plurality pipes 14 are standard ⅝ or 0.75 inch inside diameter of pipes 15 with a wall thickness of approximately 0.078 inch. The size of each pipe 15 of the plurality of pipes 14 is varied to accommodate the liquid flow and/or cooling demand for a given application.

As shown in FIG. 2, the first end portions 22 of the inflow pipes 14A of the plurality of pipes 14 connect to at least one manifold 28. In one preferred embodiment, first end portions 22 of inflow pipes 14A of first manifold 28 connect to a first manifold 28 and the first end portions 22 of the outflow pipes 14B of the plurality of pipes 14 connect to a second manifold 28. It is understood that the number of manifolds 28 can vary depending upon the intended geothermal heat exchange application. Geothermal heat exchange apparatus 10 can optionally include one or more manifolds that are connected in the field either before or after installation in the borehole. Alternatively, manifolds 28 can be connected the plurality of pipes in a controlled setting during the assembly of geothermal heat exchange apparatus 10.

Each pipe 15 of the plurality of pipes 14 is twisted onto and preferably around the central conduit or conduit 12 in a parallel, spaced and twisted arrangement. Twisted onto as defined herein includes directly positioning the plurality of pipes 14 in direct contact with central conduit 12 in an arcuate arrangement. In the preferred embodiment the plurality of pipes 14 is positioned in an approximately parallel spaced helical arrangement around the central conduit 12. Each pipe 15 of the plurality of pipes 14 is approximately in direct contact with central conduit 12. Each pipe 15 of the plurality of pipes 14 is positioned in approximately fixed spaced separation on center conduit 12 relative to the adjacent pipe 15 of the plurality of pipes 14.

The plurality of pipes 14 is a multipipe or multiple pipe twisted arrangement of the plurality of pipes 14 around center conduit 12. Individual pipes 15 of the plurality of pipes 14 can vary in their respective inside diameters, the quantity of pipes 15 in the plurality of pipes 14 and the arrangement of pipes 15 on center conduit 12 depending upon the intended application of geothermal heat exchange apparatus 10. For example, in one preferred embodiment, there are a total of eight (8) pipes 15 in a twisted arrangement around the conduit 12. The second end portion 24 of each pipe 15 of the plurality of pipes 14 connects to a joint 30 to define four (4) pairs of pipes 15 with each pair of pipes 15 connected by one joint 30. In this one preferred embodiment, joint 30 is a U-bend that receives the downwardly directed inflow from a first pipe 15 of a first set of pipes 14A and redirects the flow upwardly into a second pipe 15 of a second set of pipes 14B connected to manifold 28 in this one example.

Other arrangements the plurality of pipes 14 and joint 30 include, for example, three (3) pairs of pipes 15 with each pair of pipes 15 connected by one joint 30. Additional arrangements include joint 30 having a manifold type structure that connects to the second end portions of the first set of pipes 14A and to the second end portion of the second set of pipes 14B that includes at least one pipe 15. Thus, joint 30 can for example receive the flow input from first set of pipes 14A that is four (4) pipes 15 and redirect that flow into the second set of pipes 14B that is the same or a different quantity of pipes 15 than first set of pipes 14A. As another example, in one preferred embodiment, joint 30 receives the input flow of four (4) pipes 15 with an inside diameter of approximately 0.8 inches that is the first set of pipes 14A and redirects and realigns that flow in to joint 30 to the second set of pipes 14B that is a single pipe 15 with an inside diameter of approximately 1.6 inches. Similarly, the first set of pipes 14A of the plurality of pipes 14 for inflow can be a single pipe 15 and the second set of pipes 14B for outflow can be multiple pipes 15.

Center conduit 12 preferably has a length that is less than that of the plurality of pipes 14 in order to accommodate the central positioning of one or more joints 30 within the compact diameter of geothermal heat exchange apparatus 10. In one preferred embodiment, the plurality of pipes 14 and/or one or more joints 30 extend past conduit 12. Center conduit 12 can be any shape of tubular conduit, but preferably has a circular cross-section perpendicular to the longitudinal axis. In addition, conduit 12 can have a structure that facilitates flexing and reduces the minimum bend radius for applications such as, for example, coiling into a roll. These structures of the tubular wall of conduit 12 can include, but are not limited to undulations in any form to include corrugations 36 that retain the approximately continuous inside diameter during flexing.

Plurality of pipes 14 is preferably positioned on central conduit 12 in a twisted arrangement. In addition, each pipe 15 of the plurality of pipes 14 is positioned in an approximately fixed spaced separation with other pipes 15 in the plurality of pipes 14. A space or gap 32 is defined by the fixed spaced separation between each pipe 15 of the plurality of pipes 14.

Geothermal heat exchange apparatus 10 can further include one or more bands 34 around the twisted plurality of pipes 14 on center conduit 12. Bands 34 can optionally assist in fixing the spacing between each pipe 15 of the plurality of pipes 14. Bands 34 are preferably tape, but can be any type of structural band that assists in the retention of the spaced separation between each pipe 15 of the plurality of pipes 14. In the preferred embodiment, bands 34 are positioned approximately every four feet along the length of the plurality of pipes 14, but it is understood that this can vary with the size of each pipe 15 and size of the plurality of pipes 14 overall.

Center conduit 12 can have a solid tubular wall, but the tubular wall of conduit 12 preferably defines a plurality of apertures 38. The shape of apertures 38 is shown as being circular, but it is understood that apertures 38 can have any shape and/or directional alignment suitable for the flow of grout from conduit 12 through apertures 38.

As shown in FIG. 4, the plurality of pipes 14 is in direct contact with central conduit in this one preferred embodiment. Each pipe 15 of plurality of pipes 14 is separated by gap or space 32 defined between adjacent pipes 15 of the plurality of pipes 14. The plurality of pipes 14 is twisted such that it is tightly bound to center conduit 12. Band 34 can optionally augment the retention of the plurality of pipes 14 in fixed spaced separation.

Referring now to FIG. 5, the geothermal heat exchange apparatus 10 is structured for flexibility that includes the bending and coiling of assembled plurality of pipes 14 in the assembled twisted preferably helical arrangement around flexible center conduit 12. Geothermal heat exchange apparatus 10 can also be readily uncoiled into a linear alignment. This flexibility and compactness makes the geothermal heat exchange apparatus 10 easy to store, transport and install. Once uncoiled, the linearly extended assembly 10 can be readily installed down a borehole. The plurality of pipes 14 can have one or more joints 30 installed while coiled as well as one or more manifolds 28. The combination of manifolds 28 and joints 30 connected to the first end portion 22 and second end portion 24, respectively of the plurality of pipes 14 can be used to retain the plurality of pipes 14 in direct contact with conduit 12 and retain the desired separation between individual pipes 15 of the plurality of pipes 14 without the need for bands 34.

Figure 6:
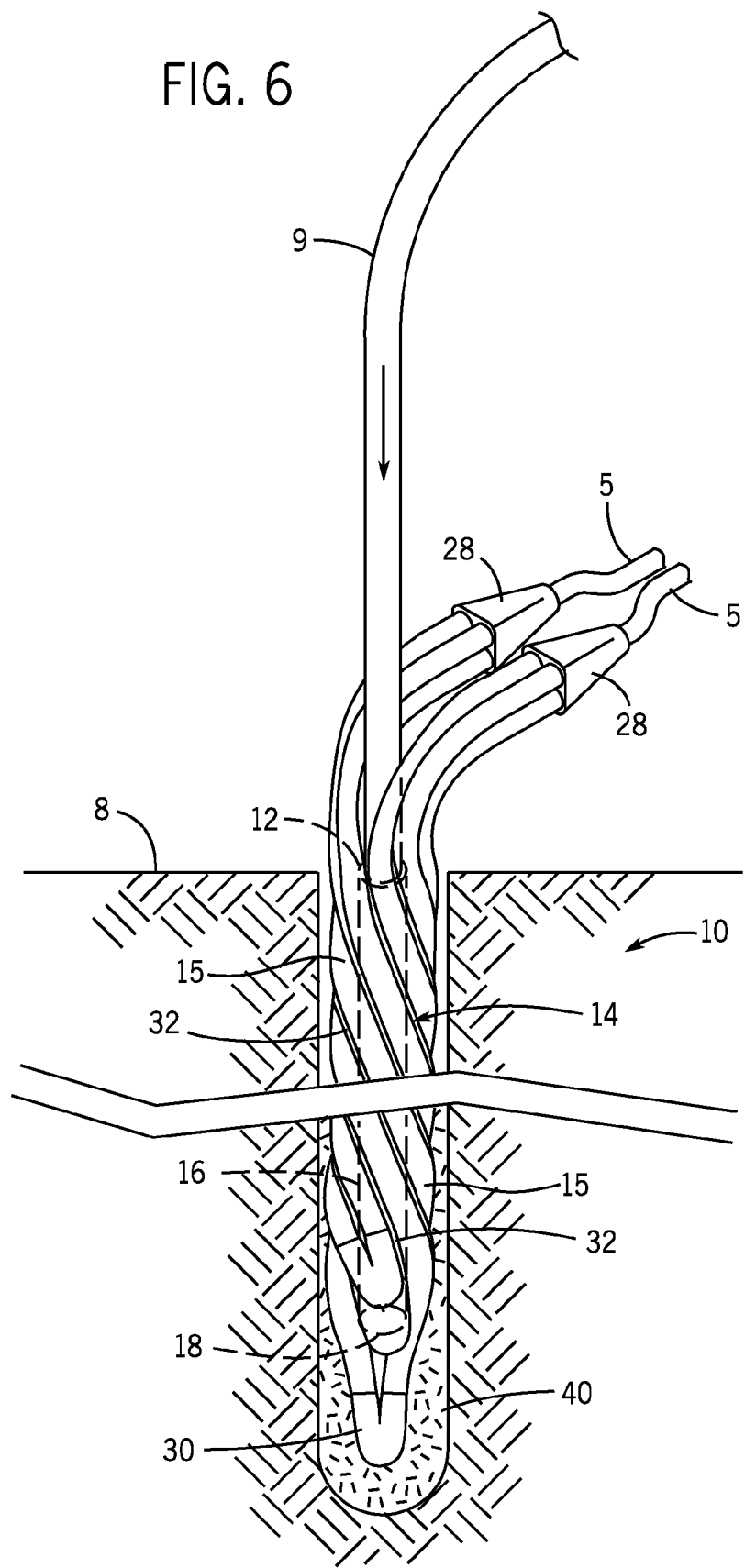
FIG. 6 is a side perspective view of the geothermal heat exchange apparatus of FIG. 2 positioned in a borehole in the earth, a source of grout connected to the geothermal heat exchange apparatus.

As shown in FIGS. 5 and 6, geothermal heat exchange apparatus 10 has been extended from the coiled position to a linear position in an approximately vertical borehole 6 in the ground. It is understood that borehole 6 is not required to be vertical and can be angled from the vertical. Once positioned in borehole 6, an external source of grout 9 is used to supply grout 40 into center conduit 12 aperture 20 in first end portion 16. Grout 40 is preferably pumped under pressure down conduit 12 and out through aperture 20 in the second end portion 18. Grout 40 surrounds the geothermal heat exchange apparatus 10 in borehole 6 through the primary loading of the grout at the bottom of the borehole and filling the borehole 6 vertically upward as is common practice. In addition, grout 40 advantageously passes through apertures 38 in the tubular wall of conduit 12 in order to provide grout 40 transverse to the longitudinal axis in order to properly fill the spaces 32 between the pipes 15 of the plurality of pipes 14 in approximately fixed spaced separation. As required for a given application, bands 34 can be applied around the plurality of pipes 14.

The relatively thin walled structure of central conduit 12 and each pipe 15 of the plurality of pipes 15 of geothermal heat exchange apparatus 10 that facilitates coiling also advantageously provides less thermal resistivity and correspondingly better heat transfer when the geothermal heat exchange apparatus 10 is installed in the earth or ground 6.

Figure 7:
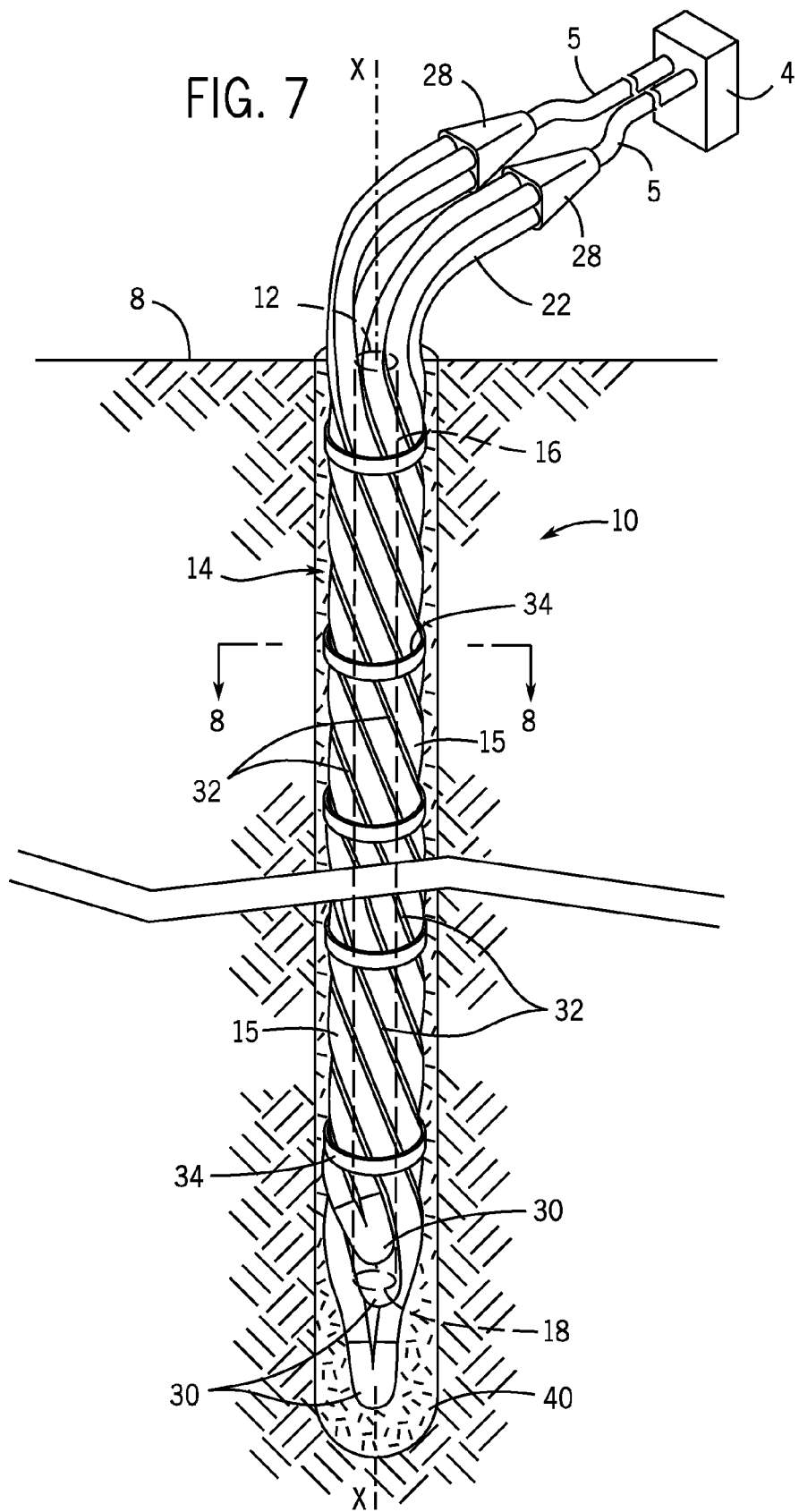
FIG. 7 is a side perspective view of the geothermal heat exchange apparatus of FIG. 6 positioned and grouted in the borehole.
Figure 8:
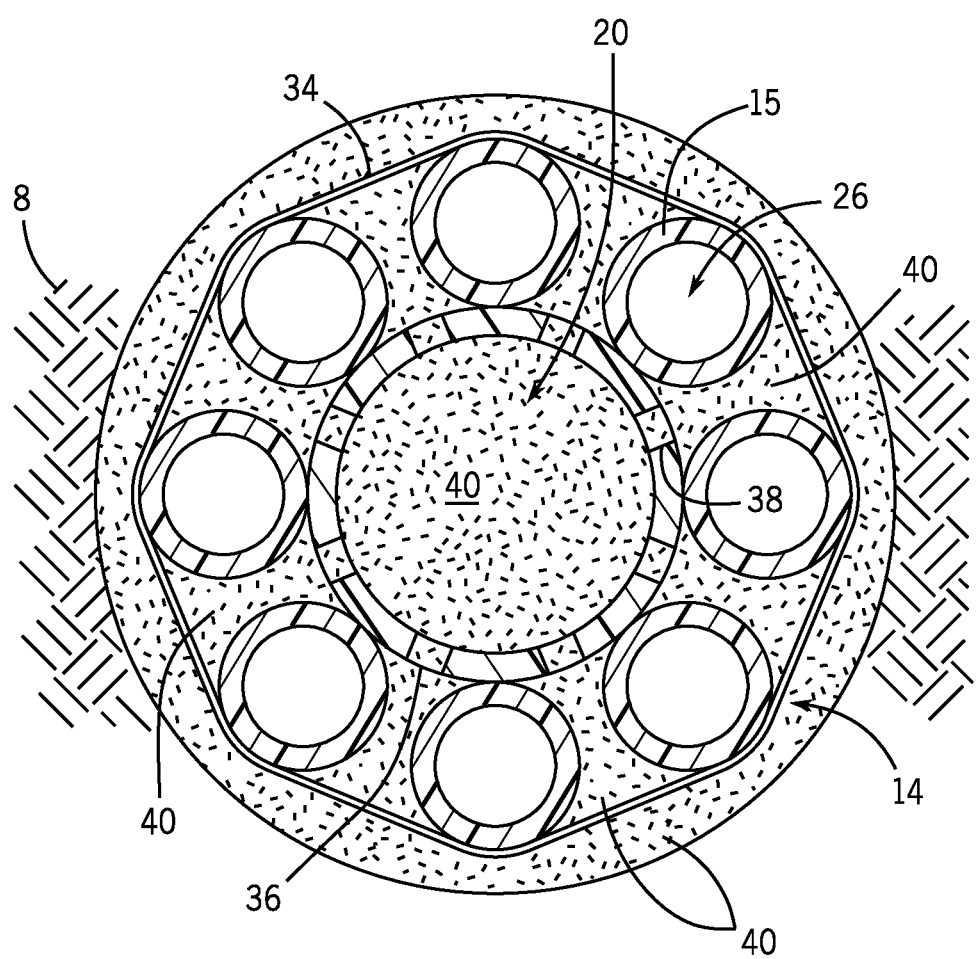
FIG. 8 is a cross-sectional taken along lines 8-8 of FIG. 7 showing the grout filling the borehole, around the plurality of pipes and the center conduit.

Referring now to FIG. 7, grout 40 fills center conduit 12 and surrounds geothermal heat exchange apparatus 10 in borehole 6 to include filling spaces 32. Geothermal heating exchange apparatus 10 has an advantageous level of heat transfer due to the helical twist in the plurality of pipes 14 and the creation of secondary effects in the fluid flow in the plurality of pipes 14. Secondary effects occurs in curved pipes 15 as the laminate flow against the boundary layer on the inside of each pipe 15 becomes a cross flow between the inner and outer pressure gradients experienced by the heat exchange fluid in the plurality of pipes 14. The secondary flow results in elevated levels of heat transfer at relatively low Reynolds numbers in the range of 1,000 or less without the high turbulence and greater pump pressure demands required by straight pipes to achieve the approximately same level of heat transfer at Reynolds number in the range of approximately 2,500—approximately 3,000. Further, the combination of multiple relatively small diameter plurality of pipes 14 provides for increased surface area for heat transfer.

In the preceding specification, the present disclosure has been described with reference to specific exemplary embodiments thereof. It will be evident, however, that various modifications, combinations and changes may be made thereto without departing from the broader spirit and scope of the invention as set forth in the claims that follow. While the present disclosure is described in terms of a series of embodiments, the present disclosure can combine one or more novel features of the different embodiments. The specification and drawings are accordingly to be regarded in an illustrative manner rather than a restrictive sense.

What is claimed is:

1. A plurality of pipes in a twisted arrangement for geothermal heat exchange, the plurality of pipes comprises:
a central conduit having a first diameter, the central conduit has a first end portion and an opposed second end portion, the central conduit being flexible and the central conduit being adapted for receiving grout; and
a plurality of pipes, each pipe of the plurality of pipes has a first end portion and an opposed second end portion, each pipe of the plurality of pipes is flexible, the plurality of pipes twisted around the central conduit in a helical arrangement, the plurality of pipes positioned in direct contact with the central conduit and each pipe of the plurality of pipes being positioned in spaced separation and defining a gap between adjacent pipes of the plurality of pipes, the plurality of pipes twisted onto the central conduit to provide an arcuate pathway for the exchange of heat, the plurality of pipes including additional surface area for heat transfer, the second end portion of each pipe of the plurality of pipes connected by a joint, the arrangement of the plurality of pipes flexible and coilable into a roll, the first end portion of each pipe of the plurality of pipes adapted to connect to an external environmental conditioning device.

2. The plurality of pipes in a twisted arrangement of claim 1, wherein the plurality of pipes includes at least three pipes and wherein the external environmental conditioning device includes at least one of heating or cooling.

3. The plurality of pipes in a twisted arrangement of claim 1, wherein the first end portion of a first set of pipes is adapted to connect to a first manifold that receives inflow to the first set of pipes and a second set of pipes is adapted to connect to a second manifold that receives outflow from the second set of pipes, the first set of pipes and the second set of pipes comprise the plurality of pipes, the manifolds adapted to connect to the external environmental conditioning device.

4. The plurality of pipes in a twisted arrangement of claim 1, wherein the central conduit has a length that is less than a length of each of the plurality of pipes, the plurality of pipes being in direct contact with and twisted around the length of the central conduit, and wherein the joint is in fluid communication with a first set of pipes of the plurality of pipes and at least one outflow pipe of the plurality of pipes.

5. The plurality of pipes in a twisted arrangement of claim 1, wherein the joint is a manifold and the manifold defines a reservoir, the manifold being in fluid communication with a first set of pipes of the plurality of pipes and directing the fluid from the first set of pipes into the reservoir, and the reservoir being in fluid communication with a second end portion of at least one outflow pipe of the plurality of pipes.

6. The plurality of pipes in a twisted arrangement of claim 1, wherein the plurality of pipes further includes bands transverse to the longitudinal axis of the plurality of pipes.

7. The plurality of pipes in a twisted arrangement of claim 1, wherein the central conduit is a through pipe that defines an aperture that extends between the first end portion and the second end portion.

8. The plurality of pipes in a twisted arrangement of claim 1, wherein the plurality of pipes is held in the twisted arrangement against the central conduit by at least one joint and at least one manifold, the at least one manifold is connected to the first end portion of each pipe, of the plurality of pipes and the at least one joint is connected to the second end portion of each pipe of the plurality of pipes, the manifold adapted to connect to the external environmental conditioning device.

9. The plurality of pipes in a twisted arrangement of claim 1, wherein the plurality of pipes is twisted onto the central conduit in the helical arrangement.

10. The plurality of pipes in a twisted arrangement of claim 1, wherein the plurality of pipes interface with the central conduit and the interface between the plurality of pipes and the central conduit binds the plurality pipes in position on the central conduit.

11. The plurality of pipes in a twisted arrangement of claim 1, wherein the plurality of pipes is twisted onto the central conduit in a minimum diameter spaced arcuate arrangement.

12. A plurality of pipes in twisted arrangement for geothermal heat exchange, the arrangement of pipes comprises:
a central conduit having a first diameter, the central conduit has a first end portion and an opposed second end portion, the central conduit being flexible, the central conduit being a through pipe and the central pipe being adapted to receive grout; and
a plurality of pipes, each pipe of the plurality of pipes has a first end portion and an opposed second end portion, each pipe of the plurality of pipes being flexible, the plurality of pipes twisted around the central conduit in a helical arrangement, the plurality of pipes twisted to bound the plurality of pipes to the central conduit, the plurality of pipes positioned in direct contact with the central conduit and each pipe of the plurality of pipes positioned in a compact spaced arrangement, the plurality of pipes define a gap between adjacent pipes of the plurality of pipes, the second end portion of each pipe of the plurality of pipes connected by a joint, the arrangement of the plurality of pipes and the central conduit being a flexible arrangement of pipes and the flexible arrangement of pipes being coilable into a roll, the first end portion of each pipe of the plurality of pipes adapted to connect to an external environmental conditioning apparatus.

13. The plurality of pipes in a twisted arrangement of claim 12, wherein the plurality of pipes further includes bands transverse to the longitudinal axis of the plurality of pipes.

14. The plurality of pipes in a twisted arrangement of claim 12, wherein the first end portion of a first set of pipes of the plurality of pipes is adapted to connect to a first manifold that receives inflow to the first set of pipes and a second set of pipes of the plurality of pipes is adapted to connect to a second manifold that receives outflow from the second set of pipes, the first set of pipes and the second set of pipes comprise the plurality of pipes, the manifold adapted to connect to the external environmental conditioning apparatus.

15. The plurality of pipes in a twisted arrangement of claim 12, wherein the structure of the plurality of pipes in a twisted arrangement provides an extended arcuate pathway for the exchange of heat through the plurality of pipes that includes additional surface area for increased heat transfer in a minimum diameter spaced arrangement of the plurality of pipes.

16. The plurality of pipes in a twisted arrangement of claim 12, wherein the central conduit has a length less than the plurality of pipes, the plurality of pipes twisted around and in direct contact with the length of the central conduit.

17. A plurality of pipes in twisted arrangement for geothermal heat exchange, the arrangement of pipes comprises:
a central conduit having a first diameter, the central conduit having a first end portion and an opposed second end portion, the central conduit being flexible, the central conduit being a through pipe, the central conduit defining an aperture that extends between the first end portion and the second end portion, the central conduit being adapted for receiving grout; and
a plurality of pipes, each pipe of the plurality of-pipes having a first end portion and an opposed second end portion, each pipe of the plurality of pipes being flexible, the plurality of pipes twisted around the central conduit and positioned in a helical arrangement, the plurality of pipes positioned in direct contact with the central conduit and each pipe of the plurality of pipes positioned in a spaced separation that defines a gap between adjacent pipes of the plurality of pipes, the central conduit having a length less than each of the plurality of pipes, the interface between the plurality of pipes and the central conduit binding the plurality of pipes in position on the central conduit, the plurality of pipes bound to the central conduit to define a minimum diameter and compact spaced separation of the plurality of pipes for heat transfer, the plurality of pipes twisted onto the central conduit in a helical arrangement for elevated levels of heat transfer, the second end portion of each pipe of the plurality of pipes connected by a joint, the arrangement of the plurality of pipes and the central conduit a flexible arrangement of pipes and the flexible arrangement of pipes coilable into a roll and uncoilable into a linearly extended arrangement of pipes, the first end portion of each pipe of the plurality of pipes adapted to connect to an external environmental conditioning apparatus, the plurality of pipes structured for the exchange of heat through the plurality of pipes, the plurality of pipes adapted to exchange heat with a geothermal environment.

18. The plurality of pipes in a twisted arrangement of claim 17, wherein the plurality of pipes is held in the twisted arrangement against the central conduit by at least one joint, the at least one joint is connected to the second end portion of each pipe of the plurality of pipes and the twisted arrangement further includes bands positioned around the plurality of pipes, the bands transverse to the longitudinal axis of the plurality of pipes.

19. The twisted arrangement of claim 17, wherein the plurality of pipes includes at least three pipes.

20. The plurality of pipes in a twisted arrangement of claim 17, wherein the plurality of pipes includes at least seven pipes.

* * * * *